Dec. 31, 1935. A. JACOBS 2,026,074
THREADLESS FASTENER FOR VALVE WASHERS
Filed Oct. 8, 1934
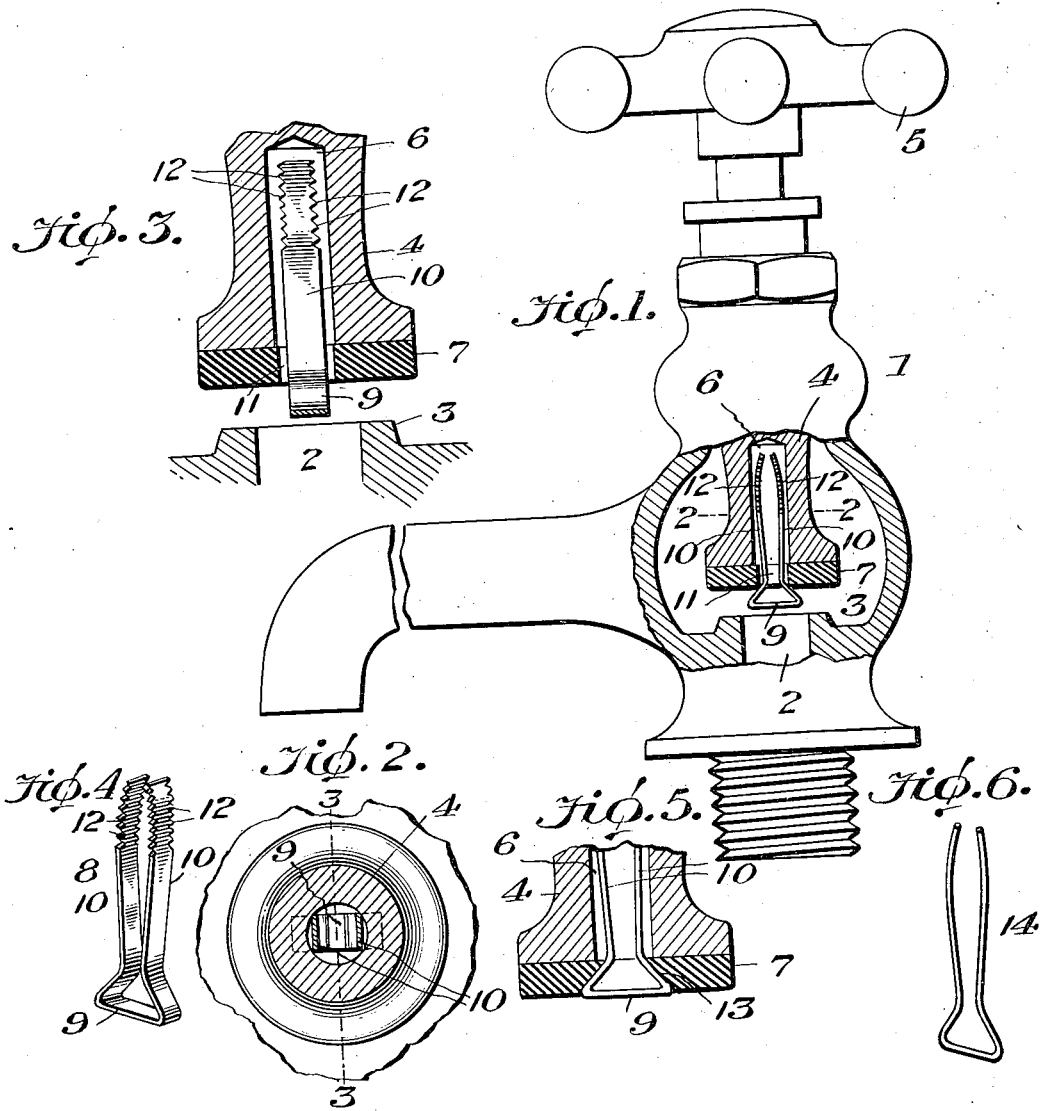
INVENTOR
Arthur Jacobs,
BY
Harry B. Cook,
ATTORNEY Patented Dec. 31, 1935

2,026,074

UNITED STATES PATENT OFFICE 2,026,074

THREADLESS FASTENER FOR VALVE WASHERS

Arthur Jacobs, Newark, N. J.

Application October 8, 1934, Serial No. 747,314

1 Claim. (Cl. 251—46)

My invention relates to faucets and more particularly to improvements in devices for securing a washer to the movable valve part thereof.

An object of my invention is to provide an improved practical device which is adapted for use with all standard types of faucets and washers to secure the washers to the movable valve parts of the faucets and eliminate the necessity for screws and screw drivers, and which may be easily and quickly attached to said parts and detached therefrom with great saving of time and labor over the usual screw threaded fasteners.

More specifically it is an object of my invention to provide an efficient novel device which may be easily and quickly inserted through the usual annular washer with which faucets are ordinarily equipped and into the usual bore in the end of the rotatable valve part of the faucet, said device to be adapted to frictionally engage the wall of the bore to securely retain the washer in proper position and constituting a removable unit separate from the washer so that it may be used with replacement washers, the device also to be constructed to permit the washer when engaged with the seat to remain stationary against rotation under the turning action of the valve member so that mutilation of the washer by turning of the same in the valve seat shall be obviated.

Other objects such as simplicity in construction, durability and low cost of manufacture are also contemplated by my invention, as will appear when the following description and claim are read with reference to the accompanying drawing.

In said drawing:

Figure 1 is a view partly in side elevation and partly in section of a standard type of faucet having a preferred embodiment of my invention applied thereto.

Figure 2 is a horizontal section taken on the line 2—2 of Figure 1 and drawn to an enlarged scale.

Figure 3 is a fragmentary view in vertical section taken on the line 3—3 of Figure 2.

Figure 4 is a perspective view of the preferred embodiment of the invention.

Figure 5 is a view partly in section and partly in elevation illustrating a modified form of washer and my novel improved washer securing device, and Figure 6 is a perspective view of a modified form of the washer securing device.

Describing my invention in detail and first with reference to the preferred embodiment thereof, as shown in Figures 1 to 4, the numeral 1 designates a faucet of a standard type having an inlet port 2, a raised valve seat 3 surrounding said port and a valve part 4 mounted in faucet by the usual screw threads (not shown) for rotation and endwise movement by the hand wheel 5 to open and close said port 2. The valve part 4 is provided with an axial bore 6 designed to receive means for securing the usual annular washer 7 to the lower end of said part for cooperation with the seat 3.

My improved washer securing device comprises a member 8 designed to be removably inserted through said washer and into said bore and formed of a single piece of flat, strip spring metal, such as spring brass or other suitable metal, bent upon itself to provide a substantial loop head 9 having inclined sides designed to be positioned on the free side of said washer, and opposed spaced apart legs 10 normally capable of being pressed together for insertion through the aperture 11 in the washer and into said bore 6 and to spring apart when inserted in the bore to frictionally engage the wall of the bore 6 and thereby hold said washer 7 against the valve part 4 with the lower edge of said aperture bearing upon the angular sides of said head. As shown, the head 9 includes a main section disposed transversely with respect to and between said legs, and opposed inclined sides between said main section and the legs. In this position of the parts, the washer 7 is loosely held against the valve part 4 by a very small bearing surface on the head 9 thereby reducing frictional contact between said washer and head 9 to a minimum. The result of the above described arrangement is that when the washer 7 is engaged with the seat 3 the valve part 4 and the securing member 8 rotate freely relative to said washer and the latter remains stationary against rotation. This obviates the cutting and grinding action of the seat against the washer such as occurs when the washer rotates on the seat. To facilitate securing the washer 7 to the valve part 4 the ends of the legs 10 are curved inwardly so that by pressing said legs together they may be caused to assume a wedge shape relation whereby they may be readily inserted through the aperture 11 and into the bore 6.

To securely anchor the member 8 in the valve part 4 the edges of the legs 10 may be serrated, or toothed, at suitable points, as at 12, to grip the wall of the bore 6.

My invention also comprehends a fixed relation of the washer 7 and washer securing member 8 permitting the washer to remain stationary against rotation when engaged with the seat 3. In this form of the invention the washer 7 is provided with an aperture 13 conforming in shape to the contour of the head 9 and in which said head is countersunk as shown in Figure 5. In this arrangement of the parts the member 8 as well as the washer 7 remains stationary against rotation, the valve part rotating about said member.

In Figure 6 my novel washer securing device 14 has been shown as formed from a single piece of resilient wire and in the same shape as the preferred embodiment of the invention. This form of the invention functions substantially as described with reference to the preferred embodiment and therefore requires no further explanation.

From the foregoing it will be seen that my invention provides a device separate from the washer for quickly securing the latter to the movable faucet valve part so that said washer will not rotate on the valve seat, and which is practically indestructible and therefore may be used repeatedly with a large number of replacement washers. Furthermore, the device is inexpensive and may be easily applied by an unskilled person without the use of tools; also it is adapted to effectively grip a smooth bore in the valve part so that the usual screw threads with which the bore is ordinarily provided may be dispensed with and the cost of manufacture of the valve thereby appreciably reduced.

Another advantage of my invention is that the same device may be used with faucets having bores in the movable valve parts of various different diameters; by bending the legs of the device to increase, or diminish the spread of said legs, the device may be adjusted to fit bores of larger or smaller diameters respectively. The necessity for carrying in stock devices of various sizes is thereby obviated.

Although a preferred embodiment of my invention has been described herein, it is to be understood that right is herein reserved to changes in construction and other modifications falling within the scope of the claim appended hereto.

Having thus described my invention what I claim is:

As an article of manufacture the combination of a washer and a device for securing the washer to an axially bored faucet valve part, said device formed of a resilient metal strip of substantially uniform cross section throughout doubled upon itself, and having a shank comprising resilient legs passing through the hole in the washer and to be inserted into yielding frictional engagement with the walls of a bore in a valve part, and a head portion abutting one side of the washer to hold the washer in position on said valve part; said head portion being in the form of a loop having a main section transversely disposed with respect to and between said legs, and opposite inclined portions between said main section and the legs, whereby said head portion enhances the resiliency of the legs and frictional engagement thereof with the walls of the bore.

ARTHUR JACOBS.